US012546615B2

(12) United States Patent
Leung et al.

(10) Patent No.: US 12,546,615 B2
(45) Date of Patent: Feb. 10, 2026

(54) SYSTEMS AND METHODS FOR PREDICTING FUEL CONSUMPTION EFFICIENCY

(71) Applicant: QUANATA, LLC, San Francisco, CA (US)

(72) Inventors: Theobolt N. Leung, San Francisco, CA (US); Eric Dahl, Newman Lake, WA (US); Kenneth Jason Sanchez, San Francisco, CA (US)

(73) Assignee: QUANATA, LLC, San Francisco, CA (US)

( * ) Notice: Subject to any disclaimer, the term of this patent is extended or adjusted under 35 U.S.C. 154(b) by 287 days.

(21) Appl. No.: 17/686,694

(22) Filed: Mar. 4, 2022

(65) Prior Publication Data

US 2022/0187087 A1 Jun. 16, 2022

Related U.S. Application Data

(63) Continuation of application No. PCT/US2020/039768, filed on Jun. 26, 2020.
(Continued)

(51) Int. Cl.
*G01C 21/34* (2006.01)
*B60W 40/09* (2012.01)
(Continued)

(52) U.S. Cl.
CPC ......... *G01C 21/3469* (2013.01); *B60W 40/09* (2013.01); *B60W 50/10* (2013.01);
(Continued)

(58) Field of Classification Search
CPC ............ G01C 21/3469; G01C 21/3484; G01C 21/3492; G01C 21/3617; B60W 40/09;
(Continued)

(56) References Cited

U.S. PATENT DOCUMENTS

| 5,009,833 A | 4/1991 | Takeuchi et al. |
| 5,877,954 A | 3/1999 | Klimasauskas et al. |

(Continued)

FOREIGN PATENT DOCUMENTS

| CN | 107730425 A | 2/2018 |
| JP | 2014021725 A | 2/2014 |

(Continued)

OTHER PUBLICATIONS

Campolina et al., "Fuel Efficient Routes Using Vehicular Sensor Data" Mobility Management And Wireless Access, pp. 29-36 (2018).
(Continued)

*Primary Examiner* — Anne Marie Antonucci
*Assistant Examiner* — Luis G Del Valle
(74) *Attorney, Agent, or Firm* — BRYAN CAVE LEIGHTON PAISNER LLP

(57) ABSTRACT

Method and system for predicting fuel consumption efficiency. For example, the method includes collecting past user driving data for one or more past vehicle trips that have already been made by a user, analyzing the past user driving data to determine one or more past user driving features related to a past fuel consumption efficiency of the user, collecting information for one or more future vehicle trips that will be made by the user during a predetermined future period of time, and predicting a future fuel consumption efficiency of the user during the predetermined future period of time based at least in part upon the information for the one or more future vehicle trips and the determined one or more past user driving features.

20 Claims, 4 Drawing Sheets

Related U.S. Application Data

(60) Provisional application No. 62/899,038, filed on Sep. 11, 2019.

(51) Int. Cl.
*B60W 50/10* (2012.01)
*G01C 21/36* (2006.01)
*G06Q 30/018* (2023.01)
*G06Q 30/0201* (2023.01)
*G06Q 30/0207* (2023.01)
*G06Q 50/06* (2024.01)
*G06Q 50/40* (2024.01)
*G07C 5/04* (2006.01)

(52) U.S. Cl.
CPC ..... *G01C 21/3484* (2013.01); *G01C 21/3492* (2013.01); *G01C 21/3617* (2013.01); *G06Q 30/018* (2013.01); *G06Q 30/0201* (2013.01); *G06Q 30/0224* (2013.01); *G07C 5/04* (2013.01); *B60W 2510/0638* (2013.01); *B60W 2530/209* (2020.02); *B60W 2540/30* (2013.01); *G06Q 50/06* (2013.01); *G06Q 50/40* (2024.01)

(58) Field of Classification Search
CPC ......... B60W 50/10; B60W 2510/0638; B60W 2530/209; B60W 2540/30; B60W 50/0097; B60W 10/06; B60W 50/08; B60W 50/14; G06Q 30/018; G06Q 30/0201; G06Q 30/0224; G06Q 50/06; G06Q 50/40; G06Q 10/04; G07C 5/04; G07C 5/008; G07C 5/0808; Y02T 10/40
See application file for complete search history.

(56) References Cited

U.S. PATENT DOCUMENTS

| | | | |
|---|---|---|---|
| 10,565,593 | B1 | 2/2020 | Aabram et al. |
| 10,830,605 | B1 | 11/2020 | Chintakindi et al. |
| 10,832,342 | B1 | 11/2020 | Gregorio et al. |
| 10,915,964 | B1 | 2/2021 | Purgatorio et al. |
| 2008/0059206 | A1 | 3/2008 | Jenkins |
| 2008/0125958 | A1 | 5/2008 | Boss et al. |
| 2009/0157510 | A1 | 6/2009 | Pridmore et al. |
| 2009/0210295 | A1 | 8/2009 | Edholm et al. |
| 2010/0049397 | A1 | 2/2010 | Liu et al. |
| 2010/0057339 | A1* | 3/2010 | Pryakhin ............ G01C 21/3492 701/532 |
| 2010/0106603 | A1 | 4/2010 | Dey et al. |
| 2010/0321910 | A1 | 12/2010 | Hsu et al. |
| 2011/0100773 | A1 | 5/2011 | Hidaka et al. |
| 2011/0106370 | A1 | 5/2011 | Duddle et al. |
| 2011/0166773 | A1* | 7/2011 | Raz ...................... B60W 50/14 701/123 |
| 2012/0004839 | A1* | 1/2012 | Mizuno ............ B60W 50/0097 701/123 |
| 2012/0232783 | A1 | 9/2012 | Calkins et al. |
| 2013/0166326 | A1 | 6/2013 | Lavie et al. |
| 2013/0246133 | A1 | 9/2013 | Dembo et al. |
| 2013/0261942 | A1* | 10/2013 | Mcquade ................ F02D 41/26 701/115 |
| 2013/0261966 | A1 | 10/2013 | Wang et al. |
| 2014/0236466 | A1 | 8/2014 | Doron |
| 2014/0277835 | A1 | 9/2014 | Filev et al. |
| 2014/0277874 | A1 | 9/2014 | Crombez et al. |
| 2014/0309914 | A1 | 10/2014 | Scofield et al. |
| 2014/0322676 | A1 | 10/2014 | Raman |
| 2015/0120107 | A1 | 4/2015 | Yu et al. |
| 2015/0226563 | A1 | 8/2015 | Cox et al. |
| 2015/0285651 | A1 | 10/2015 | Cerecke et al. |
| 2016/0033293 | A1 | 2/2016 | Nobrega |
| 2016/0034910 | A1 | 2/2016 | Davis |
| 2016/0092899 | A1 | 3/2016 | Osberg |
| 2016/0221578 | A1 | 8/2016 | Tang et al. |
| 2017/0146362 | A1 | 5/2017 | Bai et al. |
| 2017/0323244 | A1 | 11/2017 | Rani et al. |
| 2017/0351978 | A1 | 12/2017 | Bellowe |
| 2017/0364821 | A1 | 12/2017 | Mathur et al. |
| 2018/0058868 | A1 | 3/2018 | Kang et al. |
| 2018/0174485 | A1 | 6/2018 | Stankoulov |
| 2018/0285885 | A1 | 10/2018 | Laberteaux et al. |
| 2018/0345981 | A1 | 12/2018 | Ferguson et al. |
| 2019/0113354 | A1 | 4/2019 | Matsumura et al. |
| 2019/0217793 | A1 | 7/2019 | Van Hoecke et al. |
| 2019/0283591 | A1 | 9/2019 | Koebler et al. |
| 2020/0039525 | A1 | 2/2020 | Hu et al. |
| 2020/0074492 | A1 | 3/2020 | Scholl et al. |
| 2020/0168012 | A1 | 5/2020 | Boss et al. |
| 2020/0300204 | A1* | 9/2020 | Payne .................... G05D 1/021 |
| 2021/0012584 | A1 | 1/2021 | Saavedra Román |
| 2021/0370974 | A1* | 12/2021 | Park .................. B60W 60/0023 |

FOREIGN PATENT DOCUMENTS

| | | |
|---|---|---|
| KR | 20140130939 A | 11/2014 |
| WO | 2009/125178 A2 | 10/2009 |

OTHER PUBLICATIONS

International Search Report and Written Opinion received for PCT Patent Application No. PCT/US2020/039768, mailed on Sep. 2, 2020, 7 pages.

International Search Report and Written Opinion received for PCT Patent Application No. PCT/US2020/039777, mailed on Oct. 29, 2020, 13 pages.

International Search Report and Written Opinion received for PCT Patent Application No. PCT/US2020/039813, mailed on Sep. 14, 2020, 25 pages.

International Search Report and Written Opinion received for PCT Patent Application No. PCT/US2020/042306, mailed on Oct. 2, 2020, 19 pages.

Ojeda et al. "Fuel consumption prediction for heavy-duty vehicles using digital maps", 2017 IEEE 20th International Conference on Intelligent Transportation Systems (ITSC), 2017, 7 pages.

* cited by examiner

SYSTEMS AND METHODS FOR PREDICTING FUEL CONSUMPTION EFFICIENCY

CROSS-REFERENCE TO RELATED APPLICATIONS

This application is a continuation of International Application No. PCT/US2020/039768, filed Jun. 26, 2020, which claims priority to U.S. Provisional Patent Application No. 62/899,038, filed Sep. 11, 2019, both applications being incorporated by reference herein for all purposes.

FIELD OF THE DISCLOSURE

Some embodiments of the present disclosure are directed to predicting fuel consumption efficiency. More particularly, certain embodiments of the present disclosure provide methods and systems for predicting a user's fuel consumption efficiency for future trips based at least in part upon analyzing the user's past driving behavior. Merely by way of example, the present disclosure has been applied to predicting the fuel consumption efficiency of trips that the user will make during a predetermined future period of time. But it would be recognized that the present disclosure has much broader range of applicability.

BACKGROUND OF THE DISCLOSURE

Vehicle operators typically try to predict their future fuel consumption by tracking the mileage driven between refills for past trips. However, this simple calculation using past fuel usage does not taken into account of the various driver-related factors that may affect fuel consumption efficiency. Hence it is highly desirable to develop more accurate techniques for predicting future fuel consumption efficiency.

BRIEF SUMMARY OF THE DISCLOSURE

Some embodiments of the present disclosure are directed to predicting fuel consumption efficiency. More particularly, certain embodiments of the present disclosure provide methods and systems for predicting a user's fuel consumption efficiency for future trips based at least in part upon analyzing the user's past driving behavior. Merely by way of example, the present disclosure has been applied to predicting the fuel consumption efficiency of trips that the user will make during a predetermined future period of time. But it would be recognized that the present disclosure has much broader range of applicability.

According to some embodiments, a method for predicting fuel consumption efficiency includes collecting past user driving data for one or more past vehicle trips that have already been made by a user. The past user driving data include information related to a past user driving behavior. Also, the method includes analyzing the past user driving data to determine one or more past user driving features. The one or more past user driving features are related to a past fuel consumption efficiency of the user. Additionally, the method includes collecting information for one or more future vehicle trips that will be made by the user during a predetermined future period of time. Each trip of the one or more future vehicle trips corresponds to a particular pair of origination and destination points. Moreover, the method includes predicting a future fuel consumption efficiency of the user during the predetermined future period of time based at least in part upon the information for the one or more future vehicle trips and the determined one or more past user driving features.

According to certain embodiments, a computing device for predicting fuel consumption efficiency includes one or more processors and a memory that stores instructions for execution by the one or more processors. The instructions, when executed, cause the one or more processors to collect past user driving data for one or more past vehicle trips that have already been made by a user. The past user driving data include information related to a past user driving behavior. Also, the instructions, when executed, cause the one or more processors to analyze the past user driving data to determine one or more past user driving features. The one or more past user driving features are related to a past fuel consumption efficiency of the user. Additionally, the instructions, when executed, cause the one or more processors to collect information for one or more future vehicle trips that will be made by the user during a predetermined future period of time. Each trip of the one or more future vehicle trips corresponds to a particular pair of origination and destination points. Moreover, the instructions, when executed, cause the one or more processors to predict a future fuel consumption efficiency of the user during the predetermined future period of time based at least in part upon the information for the one or more future vehicle trips and the determined one or more past user driving features.

According to some embodiments, a non-transitory computer-readable medium stores instructions for predicting fuel consumption efficiency. The instructions are executed by one or more processors of a computing device. The non-transitory computer-readable medium includes instructions to collect past user driving data for one or more past vehicle trips that have already been made by a user. The past user driving data include information related to a past user driving behavior. Also, the non-transitory computer-readable medium includes instructions to analyze the past user driving data to determine one or more past user driving features. The one or more past user driving features are related to a past fuel consumption efficiency of the user. Additionally, the non-transitory computer-readable medium includes instructions to collect information for one or more future vehicle trips that will be made by the user during a predetermined future period of time. Each trip of the one or more future vehicle trips corresponds to a particular pair of origination and destination points. Moreover, the non-transitory computer-readable medium includes instructions to predict a future fuel consumption efficiency of the user during the predetermined future period of time based at least in part upon the information for the one or more future vehicle trips and the determined one or more past user driving features.

Depending upon the embodiment, one or more benefits may be achieved. These benefits and various additional objects, features and advantages of the present disclosure can be fully appreciated with reference to the detailed description and accompanying drawings that follow.

DETAILED DESCRIPTION OF THE DISCLOSURE

Some embodiments of the present disclosure are directed to predicting fuel consumption efficiency. More particularly, certain embodiments of the present disclosure provide methods and systems for predicting a user's fuel consumption efficiency for future trips based at least in part upon analyzing the user's past driving behavior. Merely by way of example, the present disclosure has been applied to predicting the fuel consumption efficiency of trips that the user will make during a predetermined future period of time. But it would be recognized that the present disclosure has much broader range of applicability.

As discussed herein, fuel consumption efficiency refers to the amount of fuel used per unit distance according to some embodiments. According to various embodiments, the fuel includes any suitable type of vehicle fuel such as gasoline, diesel, natural gas, hydrogen, propane, alcohol, other hydrocarbons, or mixtures thereof.

Figure 1:
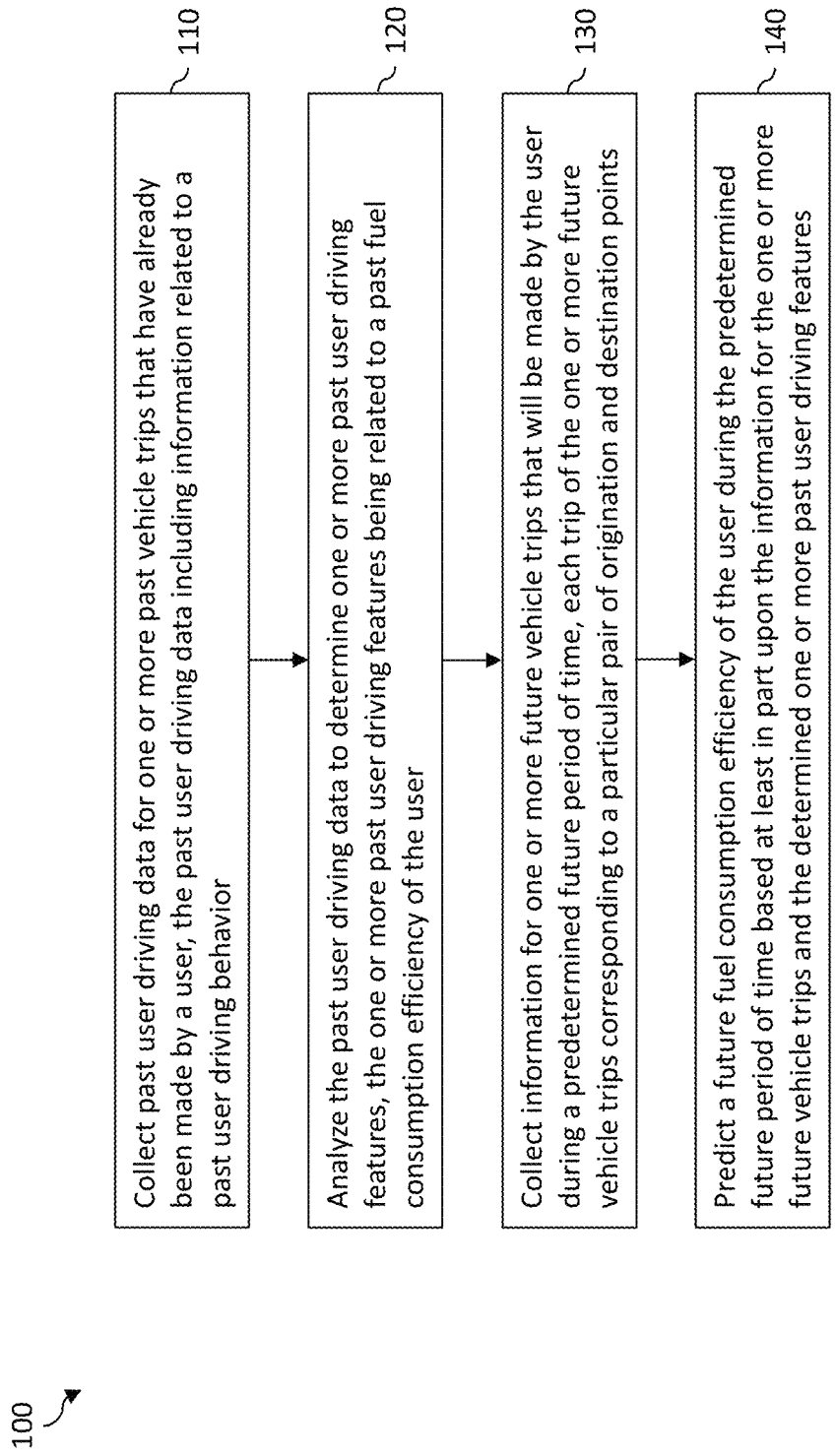
FIG. 1 is a simplified method for predicting fuel consumption efficiency according to certain embodiments of the present disclosure.

I. One or More Methods for Predicting Fuel Consumption Efficiency According to Certain Embodiments FIG. 1 is a simplified method for predicting fuel consumption efficiency according to certain embodiments of the present disclosure. This diagram is merely an example, which should not unduly limit the scope of the claims. One of ordinary skill in the art would recognize many variations, alternatives, and modifications. The method 100 includes process 110 for collecting past user driving data for past vehicle trips made by a user, process 120 for analyzing the past user driving data to determine past user driving features, process 130 for collecting information for future vehicle trips of the user, and process 140 for predicting a future fuel consumption efficiency of the user. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, some or all processes of the method are performed by a computing device or a processor directed by instructions stored in memory. As an example, some or all processes of the method are performed according to instructions stored in a non-transitory computer-readable medium.

Specifically, at the process 110, the past user driving data are collected for one or more past vehicle trips that have already been made by the user according to some embodiments. For example, the past user driving data are associated with vehicle trips that the user has made during the previous day, previous week, previous month, previous year, or any combination thereof.

According to certain embodiments, the past user driving data include information related to a past user driving behavior. As an example, the past user driving behavior represents a manner in which the user has operated a vehicle in the past. For example, the past user driving behavior indicates the user's past driving habits and/or past driving patterns.

According to some embodiments, the past user driving data are collected from one or more sensors associated with the user's vehicle. For example, the one or more sensors include any type and number of accelerometers, gyroscopes, magnetometers, location sensors (e.g., GPS sensors), tilt sensors, yaw rate sensors, speedometers, steering angle sensors, brake sensors, proximity detectors, and/or any other suitable sensors that measure vehicle state and/or operation. In certain embodiments, the one or more sensors are part of or located in the vehicle. In some embodiments, the one or more sensors are part of a computing device (e.g., a mobile device of the user) that is connected to the vehicle while the vehicle is in operation. According to certain embodiments, the past user driving data are collected continuously or at predetermined time intervals. According to some embodiments, the past user driving data are collected based on a triggering event. For example, the past user driving data are collected when each sensor has acquired a threshold amount of sensor measurements.

At the process 120, the past user driving data are analyzed to determine one or more past user driving features according to certain embodiments. As an example, the one or more past user driving features are related to a past fuel consumption efficiency of the user. For example, the past fuel consumption efficiency indicates how fuel has been consumed during past trips given the one or more past user driving features. As an example, the one or more past user driving features indicate various driving maneuvers made by the user that have impacted the amount of fuel consumed including braking (e.g., excessive braking, sudden braking, braking while reaching a turn, braking while driving in a turn), acceleration (e.g., rapid acceleration, prolonged acceleration, acceleration while driving in a turn, accelerating while exiting a turn), cornering (e.g., sharp turning, swerving), speeding (e.g., cruising, adopting speed limits), lane changing, tailgating, idling, timing of gear shifting, and/or other suitable maneuvers. According to some embodiments, the one or more past user driving features are classified by their level of severity (e.g., speed and duration at which a maneuver is performed).

According to certain embodiments, the one or more past user driving features include a first set of past user driving features that were found to have increased the past fuel consumption efficiency and a second set of past user driving features that were found to have decreased the past fuel consumption efficiency. For example, a type of maneuver belonging to the first set of past user driving features that increased the past fuel consumption efficiency includes performing smooth acceleration at moderate rates. As an example, a type of maneuver belonging to the second set of past user driving features that decreased the past fuel consumption efficiency includes using excessive braking. For example, a type of maneuver belonging to the first set of past user driving features that increased the past fuel consumption efficiency includes avoiding constant acceleration by remaining in one lane. As an example, a type of maneuver belonging to the second set of past user driving features that decreased the past fuel consumption efficiency includes making unnecessary braking and acceleration by tailgating.

According to some embodiments, the one or more past user driving features are classified according to their importance levels for either increasing or decreasing the past fuel consumption efficiency. For example, each user driving feature of the first set of past user driving features corresponds to a respective first importance level for increasing the past fuel consumption efficiency. As an example, each user driving feature of the second set of past user driving features corresponds to a respective second importance level for decreasing the past fuel consumption efficiency.

At the process 130, the information for one or more future vehicle trips that will be made by the user during a predetermined future period of time are collected according to certain embodiments. For example, the one or more future vehicle trips during the predetermined future period of time include scheduled or planned trips that the user will make during the next day, next week, next month, next year, or any combination thereof. In various embodiments, each trip of the one or more future vehicle trips corresponds to a particular pair of origination and destination points. As an example, the particular pair of origination and destination points represents a vehicle route that the user will take. For example, the particular pair of origination and destination points represents a vehicle route between the user's home and the user's workplace. As an example, the particular pair of origination and destination points represents a vehicle route between two cities.

According to some embodiments, the information for the one or more future vehicle trips include one or more vehicle information (e.g., model/year of the vehicle making the one or more future trips), one or more distance information (e.g., total distance between the particular pair of origination and destination points), one or more congestion information (e.g., expected traffic flows based upon time of day and/or day of the week that the one or more future trips will take place, expected traffic flows based upon weather conditions during the time that the one or more future trips will take place), and/or one or more other suitable information (e.g., terrain information, road construction information). In various embodiments, the expected traffic flows in the congestion information are obtained (e.g., via a third party) from analysis of historical traffic data.

According to certain embodiments, the information for the one or more future vehicle trips during the predetermined future period of time are collected by receiving the information for the one or more future vehicle trips from the user. For example, the user provides various information (e.g., origination and destination points, date of trip) associated with a schedule or planned future trip.

According to some embodiments, the information for the one or more future vehicle trips during the predetermined future period of time are collected by analyzing trip data and determining the information for the one or more future vehicle trips based at least in part upon the trip data. For example, the trip data corresponds to a time period prior to the predetermined future period of time. As an example, the trip data include information on the user's commute to and from work during the past month. For example, by analyzing this trip data about the past month, the user's scheduled commute to and from work during the upcoming month can be estimated or determined to form the basis of the information for the one or more future vehicle trips. As an example, the trip data include information on the user's summer vacation road trips during the past three years. For example, by analyzing this trip data about past road trips, planned summer vacation road trips for the upcoming year can be estimated or determined to form the basis of the information for the one or more future vehicle trips. In some examples, determining the information for the one or more future vehicle trips is based at least in part upon the trip data and one or more user inputs. As an example, after determining the user's scheduled work commute for the upcoming month based upon the trip data associated with the user's work commute during the previous month, the user has the ability to provide inputs to modify the scheduled work commute. For example, the user indicates that the last two weeks of the upcoming month will be devoted to an overseas business trip. As an example, the information for the one or more future vehicle trips for the upcoming month will be updated based upon this additional user input.

At the process 140, the future fuel consumption efficiency of the user during the predetermined period of time is predicted based at least in part upon the information for the one or more future vehicle trips and the determined one or more past user driving features according to some embodiments. For example, the future fuel consumption efficiency indicates how fuel will be consumed during future trips in view of how fuel has been consumed during past trips given the determined one or more past user driving features. As an example, if the past user driving features indicate that the user often brakes suddenly during short drives and the information for the future vehicle trips indicate that the user will make several short trips next week, then a low value for the future fuel consumption efficiency of the user will be predicted. For example, if the past user driving features indicate that the user likes to avoid making unnecessary braking/acceleration events by staying in one lane during highway travel and the information for the future vehicle trips indicate that the user will make a long distance trip on highways next month, then a high value for the future fuel consumption efficiency of the user will be predicted. According to various embodiments, the future fuel consumption efficiency serves to assist the user in developing awareness of how fuel will be being consumed so as to enable the user to better plan for future trips.

Figure 2:
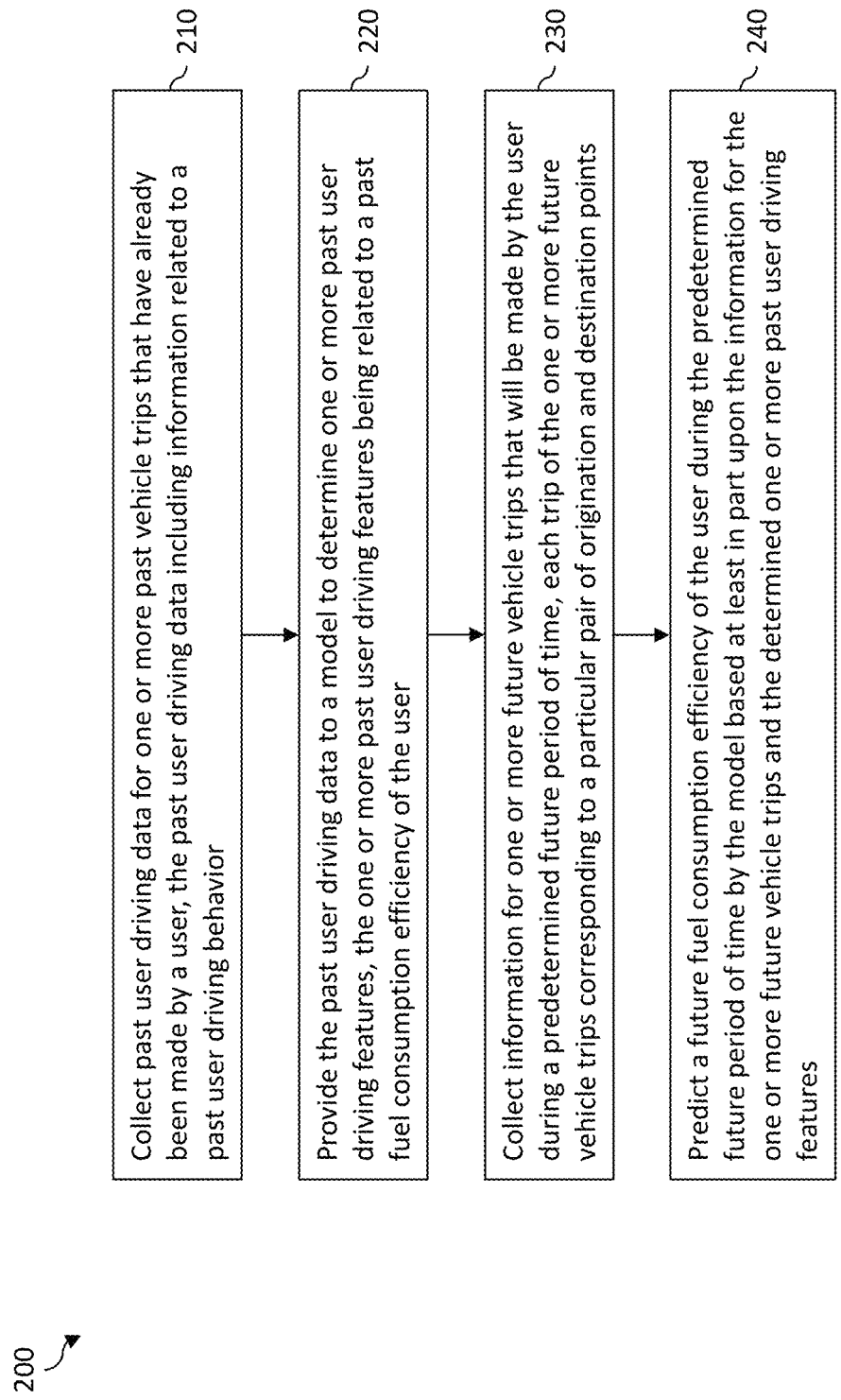
FIG. 2 is a simplified method for predicting fuel consumption efficiency according to some embodiments of the present disclosure.

FIG. 2 is a simplified method for predicting fuel consumption efficiency according to some embodiments of the present disclosure. This diagram is merely an example, which should not unduly limit the scope of the claims. One of ordinary skill in the art would recognize many variations, alternatives, and modifications. The method 200 includes process 210 for collecting past user driving data for past vehicle trips made by a user, process 220 for providing the past user driving data to a model, process 230 for collecting information for future vehicle trips of the user, and process 240 for predicting a future fuel consumption efficiency of the user by the model. In some examples, the model is a machine learning model. For example, the model is a decision tree, a Bayesian network, and/or a genetic algorithm. As an example, the model is an artificial neural network. In certain examples, the model is a statistical model. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, some or all processes of the method are performed by a computing device or a processor directed by instructions stored in memory. As an example, some or all processes of the method are performed according to instructions stored in a non-transitory computer-readable medium.

At the process 210, the past user driving data are collected for one or more past vehicle trips that have already been made by the user according to some embodiments. For example, the past user driving data include information related to a past user driving behavior (e.g., the user's past driving habits and/or past driving patterns). According to certain embodiments, the past user driving data are collected from various sensors (e.g., one or more accelerometers, one or more gyroscopes, one or more magnetometers, and/or one or more GPS sensors) associated with a vehicle operated by the user. In some embodiments, the various sensors are part of or located in the vehicle. In certain embodiments, the various sensors are part of a computing device associated with the user that is connected to the vehicle during vehicle operation.

At the process 220, the past user driving data are provided to the model to determine one or more past user driving features according to some embodiments. For example, the one or more past user driving features are related to a past fuel consumption efficiency of the user. As an example, the past fuel consumption efficiency indicates how fuel has been consumed during past trips given the one or more past user driving features. For example, the one or more past user driving features indicate various driving maneuvers (e.g., braking, acceleration, speeding, and/or cornering) made by the user that have impacted the amount of fuel consumed.

In certain embodiments, the model processes information associated with the past user driving data. In some embodiments, the model determines the one or more past user driving features based at least in part upon the past user driving data. According to certain embodiments, the model has been trained, and the trained model possesses existing knowledge of which user driving features in the past user driving data are useful in terms of determining fuel consumption efficiency. For example, determining the one or more past user driving features involves that the trained model analyzes the past user driving data based upon the existing knowledge. As an example, analyzing the past user driving data includes various tasks such as performing feature extractions, applying pattern recognition, and/or other suitable tasks.

At the process 230, the information for one or more future vehicle trips that will be made by the user during a predetermined future period of time are collected according to certain embodiments. For example, each trip of the one or more future vehicle trips corresponds to a particular pair of origination and destination points. As an example, the particular pair of origination and destination points represents a vehicle route between two geographical locations.

At the process 240, the future fuel consumption efficiency of the user during the predetermined period of time is predicted by the model based at least in part upon the information for the one or more future vehicle trips and the determined one or more past user driving features according to some embodiments. For example, the future fuel consumption efficiency indicates how fuel will be consumed during future trips considering how fuel has been consumed during past trips given the determined one or more past user driving features.

In certain embodiments, the model receives the information for the one or more future vehicle trips. In some embodiments, the model processes the information for the one or more future vehicle trips and information associated with the determined one or more past user driving features. In certain embodiments, the model determines the future fuel consumption efficiency of the user during the predetermined future period of time based at least in part upon the information for the one or more future vehicle trips and the determined one or more past user driving features. According to certain embodiments, the model has been trained, and the trained model possesses existing knowledge of which information of the future vehicle trips and which past user driving features are useful in terms of determining the future fuel consumption efficiency of the user. For example, determining the future fuel consumption efficiency of the user involves that the trained model analyzes the information for the one or more future vehicle trips and the determined one or more past user driving features based upon the existing knowledge. As an example, analyzing the information for the one or more future vehicle trips and the determined one or more past user driving features includes various tasks such as performing feature extractions, applying pattern recognition, and/or other suitable tasks.

According to some embodiments, determining the one or more past user driving features in the process 120 as shown in FIG. 1 is performed by the process 220. According to certain embodiments, the one or more past user driving features as determined by the process 220 is used by the process 140 as shown in FIG. 1. According to some embodiments, determining the future fuel consumption efficiency of the user in the process 140 as shown in FIG. 1 is performed by the process 240.

Figure 3:
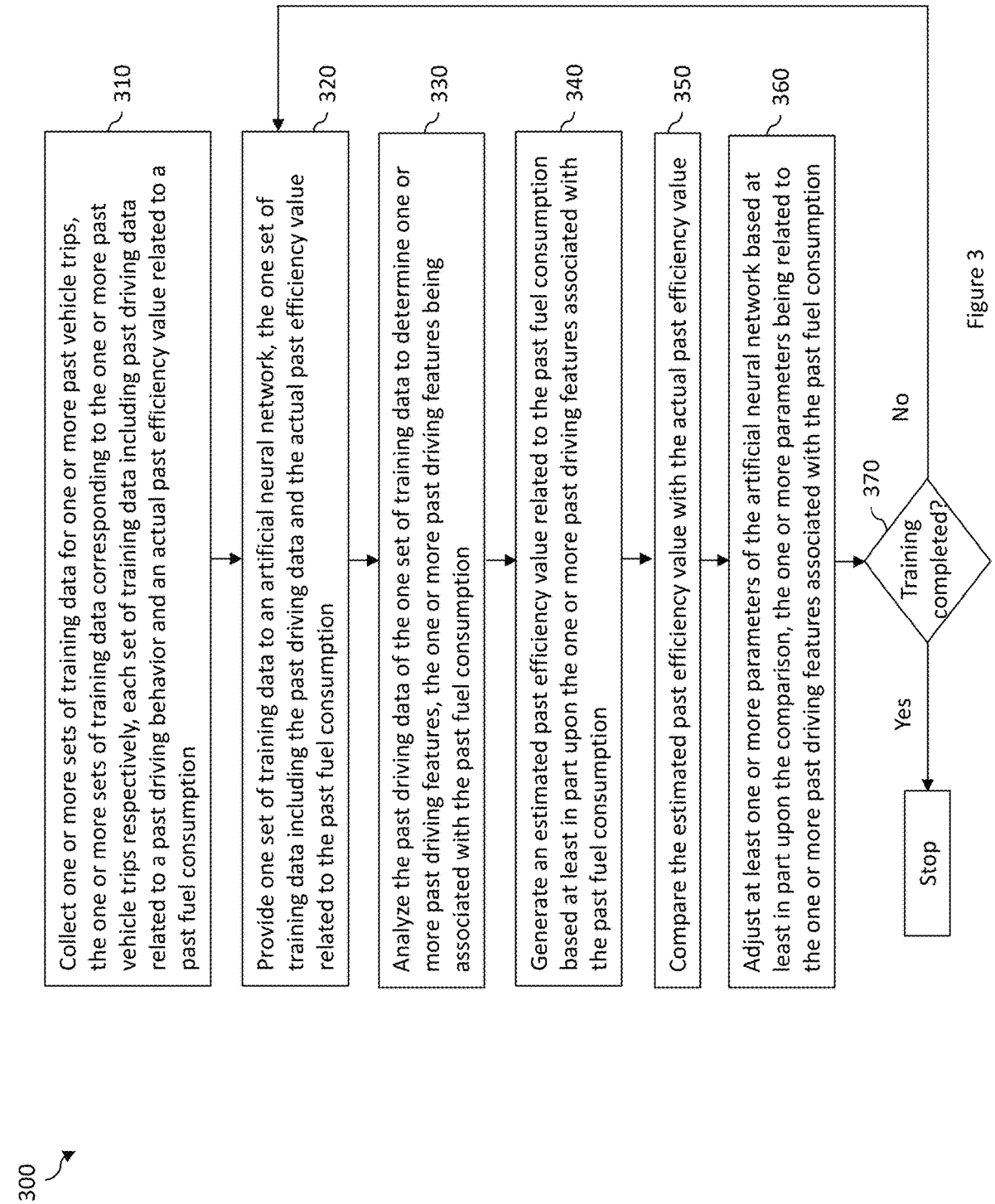
FIG. 3 is a simplified method for training an artificial neural network according to certain embodiments of the present disclosure.

FIG. 3 is a simplified method for training an artificial neural network for determining past driving features according to some embodiments of the present disclosure. This diagram is merely an example, which should not unduly limit the scope of the claims. One of ordinary skill in the art would recognize many variations, alternatives, and modifications. The method 300 includes process 310 for collecting sets of training data, process 320 for providing one set of training data to an artificial neural network for training, process 330 for analyzing the one set of training data to determine past driving features associated with a past fuel consumption, process 340 for generating an estimated past efficiency value related to the past fuel consumption, process 350 for comparing the estimated past efficiency value with an actual past efficiency value, process 360 for adjusting parameters related to the past driving features associated with the past fuel consumption in the artificial neural network, and process 370 for determining whether training of the artificial neural network has been completed. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, some or all processes of the method are performed by a computing device or a processor directed by instructions stored in memory. As an example, some or all processes of the method are performed according to instructions stored in a non-transitory computer-readable medium.

At the process 310, one or more sets of training data for one or more past vehicle trips are collected according to some embodiments. For example, each set of training data includes past driving data related to a past driving behavior and an actual past efficiency value related to a past fuel consumption. As an example, the one or more sets of training data are collected from various past vehicle trips that have already been made by users between different locations. In various embodiments, the one or more sets of training data are collected from sensors (e.g., one or more accelerometers, one or more gyroscopes, one or more magnetometers, and/or one or more GPS sensors) associated with respective vehicles operated by the users.

At the process 320, one set of training data in the one or more sets of training data is provided to the artificial neural network to train the artificial neural network according to certain embodiments. As an example, the artificial neural network is a convolutional neural network, a recurrent neural network, a modular neural network, or any other suitable type of neural network.

At the process 330, the past driving data of the one set of training data are analyzed by the artificial neural network to determine one or more past driving features associated with the past fuel consumption according to some embodiments. According to certain embodiments, the one or more past driving features indicate various past driving maneuvers (e.g., braking, acceleration, speeding, and/or cornering) that have impacted the amount of fuel consumed. For example, past driving maneuvers such as sudden braking and/or acceleration are considered to consume more fuel. As an example, past driving maneuvers such as smooth braking and/or acceleration at moderate rates are considered to consume less fuel.

At the process 340, the estimated past efficiency value related to the past fuel consumption is generated by the artificial neural network based at least in part upon the one or more past driving features according to certain embodiments. For example, in generating the estimated past efficiency value, one or more parameters related to the one or more past driving features associated with the past fuel consumption are calculated by the artificial neural network (e.g., weight values associated with various layers of connections in the artificial neural network).

At the process 350, the estimated past efficiency value is compared with the actual past efficiency value to determine an accuracy of the estimated past efficiency value according to some embodiments. According to certain embodiments, the accuracy is determined by using a loss function or a cost function for the one set of training data.

At the process 360, based at least in part upon the comparison, the one or more parameters related to the one or more past driving features associated with the past fuel consumption are adjusted by the artificial neural network. For example, the one or more parameters are adjusted in order to reduce (e.g., minimize) the loss function or the cost function.

At the process 370, a determination is made on whether the training has been completed according to certain embodiments. For example, training for the one set of training data is completed when the loss function or the cost function for the one set of training data is sufficiently reduced (e.g., minimized). As an example, training for the artificial neural network is completed when training for each of the one or more sets of training data is accomplished.

In some embodiments, if the process 370 determines that training of the artificial neural network is not yet completed, then the method 300 returns to the process 320 in an iterative manner until training is deemed to be completed.

In certain embodiments, if the process 370 determines that training of the artificial neural network is completed, then the method 300 for training the artificial neural network stops. In some examples, the artificial neural network that has been trained by the method 300 is used as a model by the process 220 and/or the process 240 of the method 200 as shown in FIG. 2. In certain examples, the trained artificial neural network possesses existing knowledge of which past driving features are desirable in terms of past fuel consumption efficiency. In some examples, the determined one or more past driving features relate to the one or more past user driving features in the process 120 of the method 100 as shown in FIG. 1 and/or in the process 220 of the method 200 as shown in FIG. 2.

Figure 4:
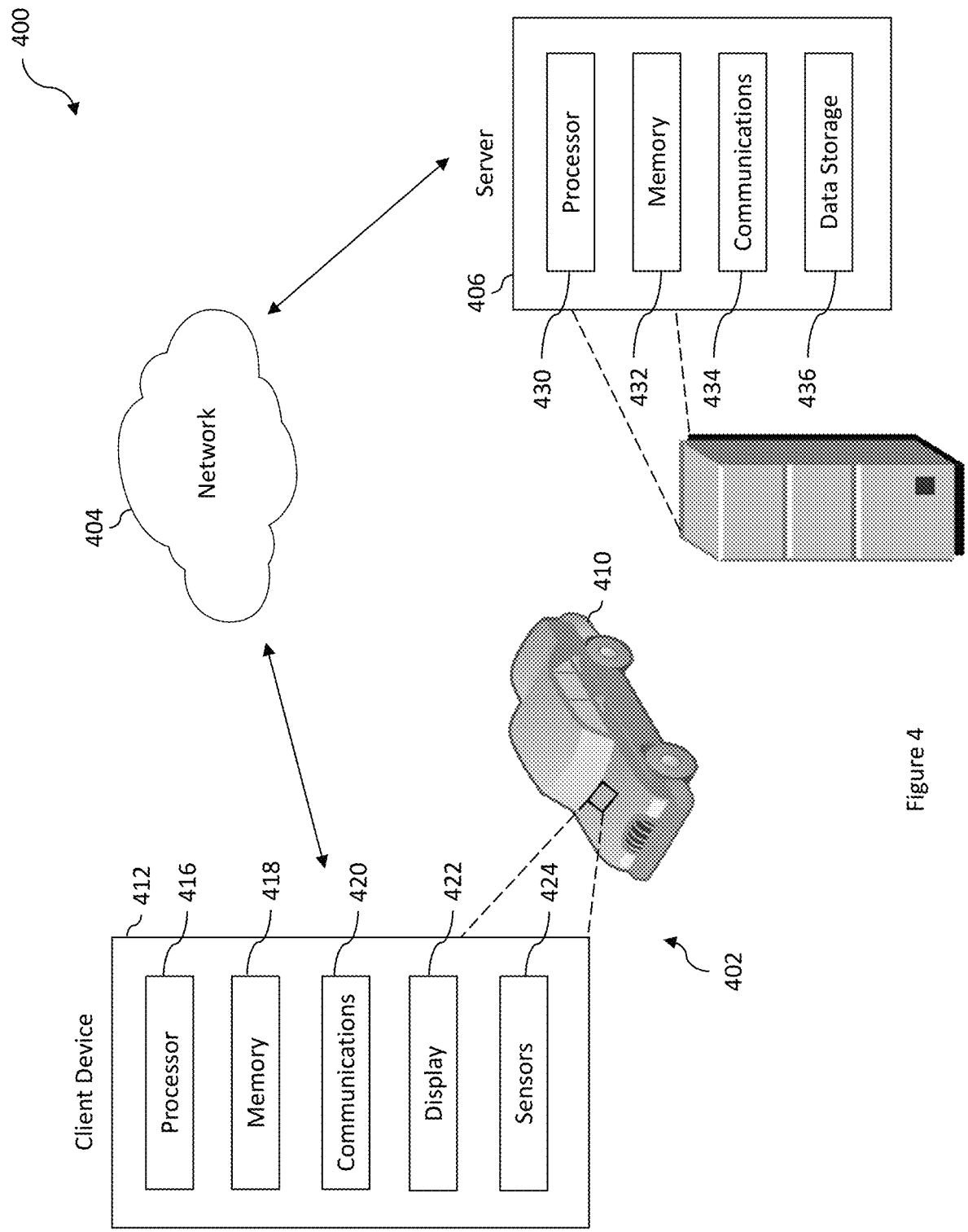
FIG. 4 is a simplified system for predicting fuel consumption efficiency according to certain embodiments of the present disclosure.

II. One or More Systems for Predicting Fuel Consumption Efficiency According to Certain Embodiments FIG. 4 is a simplified system for predicting fuel consumption efficiency according to certain embodiments of the present disclosure. This diagram is merely an example, which should not unduly limit the scope of the claims. One of ordinary skill in the art would recognize many variations, alternatives, and modifications. The system 400 includes a vehicle system 402, a network 404, and a server 406. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced.

In various embodiments, the system 400 is used to implement the method 100, the method 200, and/or the method 300. According to certain embodiments, the vehicle system 402 includes a vehicle 410 and a client device 412 associated with the vehicle 410. For example, the client device 412 is an on-board computer embedded or located in the vehicle 410. As an example, the client device 412 is a mobile device (e.g., a smartphone) that is connected (e.g., via wired or wireless links) to the vehicle 410. As an example, the client device 412 includes a processor 416 (e.g., a central processing unit (CPU), a graphics processing unit (GPU)), a memory 418 (e.g., random-access memory (RAM), read-only memory (ROM), flash memory), a communications unit 420 (e.g., a network transceiver), a display unit 422 (e.g., a touchscreen), and one or more sensors 424 (e.g., an accelerometer, a gyroscope, a magnetometer, a GPS sensor).

In some embodiments, the vehicle 410 is operated by the user. In certain embodiments, multiple vehicles 410 exist in the system 400 which are operated by respective users. As an example, during vehicle trips, the one or more sensors 424 monitor the vehicle 410 by collecting data associated with various operating parameters of the vehicle, such as speed, acceleration, braking, location, engine status, as well as other suitable parameters. In certain embodiments, the collected data include vehicle telematics data. According to some embodiments, the data are collected continuously, at predetermined time intervals, and/or based on a triggering event (e.g., when each sensor has acquired a threshold amount of sensor measurements). In various embodiments, the collected data represent the past user driving data in the method 100 and/or the method 200, and/or the one or more sets of training data in the method 300.

According to certain embodiments, the collected data are stored in the memory 418 before being transmitted to the server 406 using the communications unit 422 via the network 404 (e.g., via a local area network (LAN), a wide area network (WAN), the Internet). In some embodiments, the collected data are transmitted directly to the server 406 via the network 404. In certain embodiments, the collected data are transmitted to the server 406 via a third party. For example, a data monitoring system stores any and all data collected by the one or more sensors 424 and transmits those data to the server 406 via the network 404 or a different network.

According to certain embodiments, the server 406 includes a processor 430 (e.g., a microprocessor, a microcontroller), a memory 432, a communications unit 434 (e.g., a network transceiver), and a data storage 436 (e.g., one or more databases). In some embodiments, the server 406 is a single server, while in certain embodiments, the server 406 includes a plurality of servers with distributed processing. In FIG. 4, the data storage 436 is shown to be part of the server 406. In some embodiments, the data storage 436 is a separate entity coupled to the server 406 via a network such as the network 404. In certain embodiments, the server 406 includes various software applications stored in the memory 432 and executable by the processor 430. For example, these software applications include specific programs, routines, or scripts for performing functions associated with the method 100, the method 200, and/or the method 300. As an example, the software applications include general-purpose software applications for data processing, network communication, database management, web server operation, and/or other functions typically performed by a server.

According to various embodiments, the server 406 receives, via the network 404, the data collected by the one or more sensors 424 using the communications unit 434 and stores the data in the data storage 436. For example, the server 406 then processes the data to perform one or more processes of the method 100, one or more processes of the method 200, and/or one or more processes of the method 300.

According to certain embodiments, the future fuel consumption efficiency of the user predicted in the method 100 and/or the method 200 is transmitted back to the client device 412, via the network 404, to be provided (e.g., displayed) to the user via the display unit 422.

In some embodiments, one or more processes of the method 100, one or more processes of the method 200, and/or one or more processes of the method 300 are performed by the client device 412. For example, the processor 416 of the client device 412 processes the data collected by the one or more sensors 424 to perform one or more processes of the method 100, one or more processes of the method 200, and/or one or more processes of the method 300.

III. Examples of Certain Embodiments of the Present Disclosure

According to some embodiments, a method for predicting fuel consumption efficiency includes collecting past user driving data for one or more past vehicle trips that have already been made by a user. The past user driving data include information related to a past user driving behavior. Also, the method includes analyzing the past user driving data to determine one or more past user driving features. The one or more past user driving features are related to a past fuel consumption efficiency of the user. Additionally, the method includes collecting information for one or more future vehicle trips that will be made by the user during a predetermined future period of time. Each trip of the one or more future vehicle trips corresponds to a particular pair of origination and destination points. Moreover, the method includes predicting a future fuel consumption efficiency of the user during the predetermined future period of time based at least in part upon the information for the one or more future vehicle trips and the determined one or more past user driving features. For example, the method is implemented according to at least FIG. 1 and/or FIG. 2.

According to certain embodiments, a computing device for predicting fuel consumption efficiency includes one or more processors and a memory that stores instructions for execution by the one or more processors. The instructions, when executed, cause the one or more processors to collect past user driving data for one or more past vehicle trips that have already been made by a user. The past user driving data include information related to a past user driving behavior. Also, the instructions, when executed, cause the one or more processors to analyze the past user driving data to determine one or more past user driving features. The one or more past user driving features are related to a past fuel consumption efficiency of the user. Additionally, the instructions, when executed, cause the one or more processors to collect information for one or more future vehicle trips that will be made by the user during a predetermined future period of time. Each trip of the one or more future vehicle trips corresponds to a particular pair of origination and destination points. Moreover, the instructions, when executed, cause the one or more processors to predict a future fuel consumption efficiency of the user during the predetermined future period of time based at least in part upon the information for the one or more future vehicle trips and the determined one or more past user driving features. For example, the computing device is implemented according to at least FIG. 4.

According to some embodiments, a non-transitory computer-readable medium stores instructions for predicting fuel consumption efficiency. The instructions are executed by one or more processors of a computing device. The non-transitory computer-readable medium includes instructions to collect past user driving data for one or more past vehicle trips that have already been made by a user. The past user driving data include information related to a past user driving behavior. Also, the non-transitory computer-readable medium includes instructions to analyze the past user driving data to determine one or more past user driving features. The one or more past user driving features are related to a past fuel consumption efficiency of the user. Additionally, the non-transitory computer-readable medium includes instructions to collect information for one or more future vehicle trips that will be made by the user during a predetermined future period of time. Each trip of the one or more future vehicle trips corresponds to a particular pair of origination and destination points. Moreover, the non-transitory computer-readable medium includes instructions to predict a future fuel consumption efficiency of the user during the predetermined future period of time based at least in part upon the information for the one or more future vehicle trips and the determined one or more past user driving features. For example, the non-transitory computer-readable medium is implemented according to at least FIG. 1, FIG. 2 and/or FIG. 4.

IV. Examples of Machine Learning According to Certain Embodiments

According to some embodiments, a processor or a processing element may be trained using supervised machine learning and/or unsupervised machine learning, and the machine learning may employ an artificial neural network, which, for example, may be a convolutional neural network, a recurrent neural network, a deep learning neural network, a reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

According to certain embodiments, machine learning programs may be trained by inputting sample data sets or certain data into the programs, such as images, object statistics and information, historical estimates, and/or actual repair costs. The machine learning programs may utilize deep learning algorithms that may be primarily focused on pattern recognition and may be trained after processing multiple examples. The machine learning programs may include Bayesian Program Learning (BPL), voice recognition and synthesis, image or object recognition, optical character recognition, and/or natural language processing. The machine learning programs may also include natural language processing, semantic analysis, automatic reasoning, and/or other types of machine learning.

According to some embodiments, supervised machine learning techniques and/or unsupervised machine learning techniques may be used. In supervised machine learning, a processing element may be provided with example inputs and their associated outputs and may seek to discover a general rule that maps inputs to outputs, so that when subsequent novel inputs are provided the processing element may, based upon the discovered rule, accurately predict the correct output. In unsupervised machine learning, the processing element may need to find its own structure in unlabeled example inputs.

V. Additional Considerations According to Certain Embodiments

For example, some or all components of various embodiments of the present disclosure each are, individually and/or in combination with at least another component, implemented using one or more software components, one or more hardware components, and/or one or more combinations of software and hardware components. As an example, some or all components of various embodiments of the present disclosure each are, individually and/or in combination with at least another component, implemented in one or more circuits, such as one or more analog circuits and/or one or more digital circuits. For example, while the embodiments described above refer to particular features, the scope of the present disclosure also includes embodiments having different combinations of features and embodiments that do not include all of the described features. As an example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Certain implementations may also be used, however, such as firmware or even appropriately designed hardware configured to perform the methods and systems described herein.

The systems' and methods' data (e.g., associations, mappings, data input, data output, intermediate data results, final data results) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A method for predicting fuel consumption efficiency, the method comprising:
   collecting, by a computing device and from one or more sensors, past user driving data for one or more past vehicle trips made by a user, wherein the one or more sensors include at least one of a GPS sensor or an accelerometer, and wherein the past user driving data includes at least one of acceleration data, braking data, or location data;
   analyzing, by the computing device, historical trip data including past commute patterns and vehicle route data to:
      determine one or more routes for one or more future vehicle trips to be made by the user during a predetermined future period of time; and
      modify the one or more routes based on receiving one or more user inputs to update information for the one or more future vehicle trips;
   training an artificial neural network (ANN) configured as a convolutional neural network (CNN) or a recurrent neural network (RNN) for analyzing driving features and predicting fuel consumption efficiencies, wherein the training the ANN comprises:
- analyzing, by the ANN, training driving data included in one or more sets of training data to determine one or more training driving features associated with past fuel consumption, wherein the analyzing the training driving data includes performing at least one of feature extraction or pattern recognition to identify patterns in the at least one of the acceleration data, the braking data, or the location data, and wherein the patterns include at least one of braking patterns, acceleration patterns, or cornering patterns;
- generating, by the ANN, using weight values associated with layers of the ANN, an estimated past efficiency value related to the past fuel consumption based at least in part upon the one or more training driving features determined from the training driving data included in the one or more sets of training data;
- comparing, by the ANN, the estimated past efficiency value with an actual past efficiency value to determine an accuracy of the estimated past efficiency value using one or more of a loss function or a cost function; and
- adjusting, by the ANN, one or more parameters of the ANN including the weight values associated with the layers of the ANN, based at least in part upon the estimated past efficiency value with the actual past efficiency value, as compared, to reduce one or more magnitudes of one or more outputs of the one or more of the loss function or the cost function until the loss function or the cost function is minimized for the one or more sets of training data;

analyzing, by the computing device using the ANN, as trained, the past user driving data to determine one or more past user driving features, wherein the one or more past user driving features are related to a past fuel consumption efficiency of the user, wherein the past fuel consumption efficiency of the user indicates how fuel was consumed by the user during the one or more past vehicle trips given the one or more past user driving features, and wherein the one or more past user driving features include one or more of braking, accelerating, cornering, speeding, lane changing, tailgating, idling, or timing of gear shifting;

predicting, by the computing device using the ANN, as trained, a future fuel consumption efficiency of the user during the predetermined future period of time based at least in part upon the information for the one or more future vehicle trips and the one or more past user driving features related to the past fuel consumption efficiency of the user during the one or more past vehicle trips given the one or more past user driving features; and outputting, by the computing device and to a client device for display on the client device, the future fuel consumption efficiency, as predicted, for the one or more routes, as determined and modified, for the one or more future vehicle trips.

2. The method of claim 1, wherein the analyzing, by the computing device using the ANN, as trained, the past user driving data to determine the one or more past user driving features includes:
- providing the past user driving data;
- processing information associated with the past user driving data; and
- determining the one or more past user driving features based at least in part upon the past user driving data.

3. The method of claim 2, wherein the predicting, by the computing device using the ANN, as trained, the future fuel consumption efficiency of the user during the predetermined future period of time includes:
- providing the information for the one or more future vehicle trips;
- processing the information for the one or more future vehicle trips and information associated with the one or more past user driving features; and
- determining the future fuel consumption efficiency of the user during the predetermined future period of time based at least in part upon the information for the one or more future vehicle trips and the one or more past user driving features.

4. The method of claim 1, wherein the one or more past user driving features include:
- one or more first past user driving features that increase the past fuel consumption efficiency of the user; and
- one or more second past user driving features that decrease the past fuel consumption efficiency of the user;
- wherein:
  - the one or more first past user driving features correspond to one or more first importance levels respectively for increasing the past fuel consumption efficiency of the user; and
  - the one or more second past user driving features correspond to one or more second importance levels respectively for decreasing the past fuel consumption efficiency of the user, wherein the one or more first importance levels and the one or more second importance levels are determined by the ANN.

5. The method of claim 1, wherein the information for the one or more future vehicle trips includes:
- vehicle information for the one or more future vehicle trips;
- distance information for the one or more future vehicle trips; and
- congestion information for the one or more future vehicle trips.

6. A computing device for predicting fuel consumption efficiency, the computing device comprising:
- one or more processors; and
- a memory storing instructions that, when executed by the one or more processors, cause the one or more processors to:
  - collect, from one or more sensors, past user driving data for one or more past vehicle trips made by a user, wherein the one or more sensors include at least one of a GPS sensor or an accelerometer, and wherein the past user driving data includes at least one of acceleration data, braking data, or location data;
  - analyze historical trip data including past commute patterns and vehicle route data to:
    - determine one or more routes for one or more future vehicle trips to be made by a user during a predetermined future period of time; and
    - modify the one or more routes based on receiving one or more user inputs to update information for the one or more future vehicle trips;
  - train an artificial neural network (ANN) configured as a convolutional neural network (CNN) or a recurrent neural network (RNN) for analyzing driving features and predicting fuel consumption efficiencies, comprising:
    - analyze, by the ANN, training driving data included in one or more sets of training data to determine one or more training driving features associated with past fuel consumption, wherein analyzing the training driving data includes performing at least one of feature extraction or pattern recognition to identify patterns in the at least one of the acceleration data, the braking data, or the location data, and wherein the patterns include at least one of braking patterns, acceleration patterns, or cornering patterns;

generate, by the ANN, using weight values associated with layers of the ANN, an estimated past efficiency value related to the past fuel consumption based at least in part upon the one or more training driving features determined from the training driving data included in the one or more sets of training data;

compare, by the ANN, the estimated past efficiency value with an actual past efficiency value to determine an accuracy of the estimated past efficiency value using one or more of a loss function or a cost function; and adjust, by the ANN, one or more parameters of the ANN including the weight values associated with the layers of the ANN, based at least in part upon the estimated past efficiency value with the actual past efficiency value, as compared, to reduce one or more magnitudes of one or more outputs of the one or more of the loss function or the cost function until the loss function or the cost function is minimized for the one or more sets of training data;

analyze, using the ANN, as trained, the past user driving data to determine one or more past user driving features, wherein the one or more past user driving features are related to a past fuel consumption efficiency of the user, wherein the past fuel consumption efficiency of the user indicates how fuel was consumed by the user during the one or more past vehicle trips given the one or more past user driving features, and wherein the one or more past user driving features include one or more of braking, accelerating, cornering, speeding, lane changing, tailgating, idling, or timing of gear shifting;

predict, using the ANN, as trained, a future fuel consumption efficiency of the user during the predetermined future period of time based at least in part upon the information for the one or more future vehicle trips and the one or more past user driving features related to the past fuel consumption efficiency of the user during the one or more past vehicle trips given the one or more past user driving features; and output to a client device for display on the client device, the future fuel consumption efficiency, as predicted, for the one or more routes, as determined and modified, for the one or more future vehicle trips.

7. The computing device of claim 6, wherein the instructions that cause the one or more processors to analyze, using the ANN, as trained, the past user driving data to determine the one or more past user driving features further comprise instructions that cause the one or more processors to:

provide the past user driving data;

process information associated with the past user driving data; and determine the one or more past user driving features based at least in part upon the past user driving data.

8. The computing device of claim 7, wherein the instructions that cause the one or more processors to predict, using the ANN, as trained, the future fuel consumption efficiency of the user during the predetermined future period of time further comprise instructions that cause the one or more processors to:

provide the information for the one or more future vehicle trips;

process the information for the one or more future vehicle trips and information associated with the one or more past user driving features; and determine the future fuel consumption efficiency of the user during the predetermined future period of time based at least in part upon the information for the one or more future vehicle trips and the one or more past user driving features.

9. The computing device of claim 6, wherein the one or more past user driving features include:

one or more first past user driving features that increase the past fuel consumption efficiency of the user; and one or more second past user driving features that decrease the past fuel consumption efficiency of the user;

wherein:

the one or more first past user driving features correspond to one or more first importance levels respectively for increasing the past fuel consumption efficiency of the user; and the one or more second past user driving features correspond to one or more second importance levels respectively for decreasing the past fuel consumption efficiency of the user, wherein the one or more first importance levels and the one or more second importance levels are determined by the ANN.

10. The computing device of claim 6, wherein the information for the one or more future vehicle trips includes:

vehicle information for the one or more future vehicle trips;

distance information for the one or more future vehicle trips; and congestion information for the one or more future vehicle trips.

11. A non-transitory computer-readable medium storing instructions for predicting fuel consumption efficiency, the instructions when executed by one or more processors of a computing device cause the computing device to:

collect, from one or more sensors, past user driving data for one or more past vehicle trips made by a user, wherein the one or more sensors include at least one of a GPS sensor or an accelerometer, and wherein the past user driving data includes at least one of acceleration data, braking data, or location data;

analyze historical trip data including past commute patterns and vehicle route data to:

determine one or more routes for one or more future vehicle trips to be made by a user during a predetermined future period of time; and modify the one or more routes based on receiving one or more user inputs to update information for the one or more future vehicle trips;

use an artificial neural network (ANN) configured as a convolutional neural network (CNN) or a recurrent neural network (RNN), as trained, for analyzing driving features and predicting fuel consumption efficiencies, wherein training the ANN comprises steps to:

analyze, by the ANN, training driving data included in one or more sets of training data to determine one or more training driving features associated with past fuel consumption, wherein analyzing the training driving data includes performing at least one of feature extraction or pattern recognition to identify patterns in the at least one of the acceleration data, the braking data, or the location data, and wherein the patterns include at least one of braking patterns, acceleration patterns, or cornering patterns;

generate, by the ANN, using weight values associated with layers of the ANN, an estimated past efficiency value related to the past fuel consumption based at least in part upon the one or more training driving features determined from the training driving data included in the one or more sets of training data;

compare, by the ANN, the estimated past efficiency value with an actual past efficiency value to determine an accuracy of the estimated past efficiency value using one or more of a loss function or a cost function; and adjust, by the ANN, one or more parameters of the ANN including the weight values associated with the layers of the ANN, based at least in part upon the estimated past efficiency value with the actual past efficiency value, as compared, to reduce one or more magnitudes of one or more outputs of the one or more of the loss function or the cost function until the loss function or the cost function is minimized for the one or more sets of training data;

analyze, using the ANN, as trained, the past user driving data to determine one or more past user driving features, wherein the one or more past user driving features are related to a past fuel consumption efficiency of the user, wherein the past fuel consumption efficiency of the user indicates how fuel was consumed by the user during the one or more past vehicle trips given the one or more past user driving features, and wherein the one or more past user driving features include one or more of braking, accelerating, cornering, speeding, lane changing, tailgating, idling, or timing of gear shifting;

predict, using the ANN, as trained, a future fuel consumption efficiency of the user during the predetermined future period of time based at least in part upon the information for the one or more future vehicle trips and the one or more past user driving features related to the past fuel consumption efficiency of the user during the one or more past vehicle trips given the one or more past user driving features; and output, to a client device for display on the client device, the future fuel consumption efficiency, as predicted, for the one or more routes, as determined and modified, for the one or more future vehicle trips.

12. The non-transitory computer-readable medium storing the instructions for predicting the fuel consumption efficiency of claim 11, wherein the instructions when executed by the one or more processors that cause the computing device to analyze, using the ANN, as trained, the past user driving data to determine the one or more past user driving features further cause the computing device to:
provide the past user driving data;
process information associated with the past user driving data; and
determine the one or more past user driving features based at least in part upon the past user driving data.

13. The non-transitory computer-readable medium storing the instructions for predicting the fuel consumption efficiency of claim 12, wherein the instructions when executed by the one or more processors that cause the computing device to predict, using the ANN, as trained, the future fuel consumption efficiency of the user during the predetermined future period of time further cause the computing device to:
provide the information for the one or more future vehicle trips;
process the information for the one or more future vehicle trips and information associated with the one or more past user driving features; and
determine the future fuel consumption efficiency of the user during the predetermined future period of time based at least in part upon the information for the one or more future vehicle trips and the one or more past user driving features.

14. The non-transitory computer-readable medium of claim 11, wherein the one or more sensors further comprise one or more of a gyroscope, a magnetometer, a speedometer, a steering-angle sensor, a brake sensor, a yaw-rate sensor, or a proximity detector.

15. The non-transitory computer-readable medium of claim 11, wherein collecting the past user driving data is performed in response to a triggering event comprising that each sensor of the one or more sensors acquires a threshold amount of sensor measurements.

16. The non-transitory computer-readable medium of claim 11, wherein updating the information for the one or more future vehicle trips further comprises obtaining congestion information derived from analysis of historical traffic data provided by a third party.

17. The non-transitory computer-readable medium of claim 11, wherein the computing device comprises the client device embedded in or connected to a vehicle and includes a display unit and the one or more sensors.

18. The non-transitory computer-readable medium of claim 11, wherein the analyzing, using the ANN, as trained, the past user driving data to determine the one or more past user driving features includes:
providing the past user driving data;
processing information associated with the past user driving data; and
determining the one or more past user driving features based at least in part upon the past user driving data.

19. The non-transitory computer-readable medium of claim 11, wherein the one or more past user driving features include:
one or more first past user driving features that increase the past fuel consumption efficiency of the user; and
one or more second past user driving features that decrease the past fuel consumption efficiency of the user;
wherein:
the one or more first past user driving features correspond to one or more first importance levels respectively for increasing the past fuel consumption efficiency of the user; and
the one or more second past user driving features correspond to one or more second importance levels respectively for decreasing the past fuel consumption efficiency of the user, wherein the one or more first importance levels and the one or more second importance levels are determined by the ANN.

20. The non-transitory computer-readable medium of claim 11, wherein the information for the one or more future vehicle trips includes:
vehicle information for the one or more future vehicle trips;
distance information for the one or more future vehicle trips; and
congestion information for the one or more future vehicle trips.

* * * * *